Patented Aug. 3, 1948

2,446,505

UNITED STATES PATENT OFFICE 2,446,505

METHOD OF INHIBITING THE GROWTH OF MOLD

Simon Weil Arenson, Baltimore, Md., assignor to Doughnut Corporation of America, New York, N. Y., a corporation of New York No Drawing. Application April 12, 1946, Serial No. 661,866

7 Claims. (Cl. 167—22)

My invention relates to a method and means of inhibiting mold growth and a method and means of inhibiting the growth of microorganisms responsible for the condition known as ropiness in cereal products.

The main object of my invention is the provision of a method of inhibiting the growth of mold, and the development of ropiness in cereal products; and associated therewith as a main object is the provision of a product to inhibit the growth of mold and development of ropiness in cereal products.

Another object of my invention is the utilization of esters of propylene glycol to prevent or inhibit the growth of mold, and the development of ropiness in cereal products.

Another object of my invention is the utilization of esters of dipropylene glycol to prevent or inhibit the growth of mold, and the development of ropiness in cereal products.

Still another object of my invention is the utilization of mono- and di-esters of propylene glycol with the straight chain, saturated, monocarboxylic acids of from 2 through 10 carbon atoms, to prevent or inhibit the growth of mold, and the development of ropiness in cereal products.

Still another object of my invention is the utilization of mono- and di-esters of dipropylene glycol with the straight chain, saturated, monocarboxylic acids of from 2 through 10 carbon atoms, to prevent or inhibit the growth of mold, and the development of ropiness in cereal products.

Other and further objects of my invention will, in part, be pointed out specifically hereinbelow, and still others will be apparent from the following description of my invention and its practice.

I have discovered that the growth of molds such as Aspergillus niger, Penicillium glaucum, Penicillium expansum, Rhizopus nigrans, Trichothecium roseum and other common molds, as well as organisms of the B. mesentericus group such as Bacillus mesentericus vulgatus (which causes ropiness in cereal products) may be inhibited or entirely prevented by the utilization of mono- and di-esters of 1-2 propylene glycol or mono- and di-esters of dipropylene glycol with the straight chain, saturated, monocarboxylic acids of from 2 through 10 carbon atoms in quantities sufficient to be effective.

I have found specifically that the following esters of 1-2 propylene glycol are well adapted to the practice of my invention:

Propylene glycol monoacetate
Propylene glycol diacetate
Propylene glycol monopropionate
Propylene glycol dipropionate
Propylene glycol monobutyrate
Propylene glycol dibutyrate
Propylene glycol monovalerate
Propylene glycol divalerate
Propylene glycol monocaproate
Propylene glycol dicaproate
Propylene glycol monoheptanate
Propylene glycol diheptanate
Propylene glycol monocaprylate
Propylene glycol dicaprylate
Propylene glycol monopelargonate
Propylene glycol dipelargonate
Propylene glycol monocaprate
Propylene glycol dicaprate I have found specifically that the following esters of dipropylene glycol are well adapted for the practice of my invention:

Dipropylene glycol monoacetate
Dipropylene glycol diacetate
Dipropylene glycol monopropionate
Dipropylene glycol dipropionate
Dipropylene glycol monobutyrate
Dipropylene glycol dibutyrate
Dipropylene glycol monovalerate
Dipropylene glycol divalerate
Dipropylene glycol monocaproate
Dipropylene glycol dicaproate
Dipropylene glycol monoheptanate
Dipropylene glycol diheptanate
Dipropylene glycol monocaprylate
Dipropylene glycol dicaprylate
Dipropylene glycol monopelargonate
Dipropylene glycol dipelargonate
Dipropylene glycol monocaprate
Dipropylene glycol dicaprate I have found further that the mono-esters of 1-2 propylene glycol are well adapted for the practice of my invention and cite hereinbelow two specific mono-esters of propylene glycol as examples:

Propylene glycol monopropionate
Propylene glycol monopelargonate

I have found also that the di-esters are well adapted for the practice of my invention and cite below two specific diesters of propylene glycol as examples:

Propylene glycol diacetate
Propylene glycol dicaprate

I have found further that the following mixed esters are well adapted for the practice of my invention and cite below two mixed esters of 1-2 propylene glycol as examples thereof:

Propylene glycol butyrate heptanate
Propylene glycol caprylate caproate

Also, I have found that a mixture of any of the esters is well adapted for the practice of my invention, and cite below as an example a mixture of esters of propylene glycol.

Propylene glycol monopropionate
Propylene glycol monoacetate

These may be mixed together in any desired proportions, and the resultant mixture will accomplish the desired results.

Also, I have found that the mono-esters of dipropylene glycol are well adapted for the practice of my invention, and cite below two mono esters of dipropylene glycol as examples thereof:

Dipropylene glycol monoacetate
Dipropylene glycol monopelargonate

Also, I have found that di-esters of di-propylene glycol are well adapted for the practice of my invention, and cite below the two di-esters of dipropylene glycol as examples thereof:

Dipropylene glycol dipropionate
Dipropylene glycol diheptanate

Also, I have found that the mixed esters of dipropylene glycol are well adapted for the practice of my invention and cite below two mixed esters of dipropylene glycol as examples thereof:

Dipropylene glycol caproate butyrate
Dipropylene glycol valerate caprylate

Further, I have found that a mixture of any of the esters is well adapted for the practice of my invention, and cite below an example of a mixture of esters of dipropylene glycol.

Dipropylene glycol monoacetate
Dipropylene glycol monopelargonate

These may be mixed together in any desired proportions, and the resultant mixture will accomplish the desired results.

I have found further that a mixture of any of the esters of propylene and dipropylene glycols is well adapted for the practice of my invention, and cite one below as a general example of a mixture of esters of propylene glycol and dipropylene glycol.

Propylene glycol diproprionate
Dipropylene glycol monoacetate

These may be mixed together in any desired proportions, and the resultant mixture will accomplish the desired results.

All of these compounds are to all practical intents and purposes only slightly soluble in water. They are all esters of propylene glycol or its polymer dipropylene glycol, with straight chain, saturated, aliphatic monocarboxylic acids of from 2 through 10 carbons atoms. Physically the esters are fat-like liquids and their principal distinguishing characteristic is that they are either fat soluble or fat dispersible.

The following are exemplary methods of practicing my invention.

In treating food products, as cereal bakery products made from glutenous flour, whether leavened chemically, by yeast fermentation, or by mechanical incorporation of air, I may incorporate the non-toxic esters in concentration as low as $\frac{1}{10}$ of 1% in the dough or batter before baking. As an alternative, I may spray or brush-apply the esters on the finished and baked products. As another alternative, I may apply the esters to the material in which the products are wrapped or incorporate it in the wrapping material, and I have found that after either of these treatments the foods do not develop mold or ropiness for a much longer period of time than do foods not so treated. The natural flavor of the cereal bakery products is maintained due to the inhibiting action of the esters on the molds, and the B. mesentericus group which tend to impart undesirable tastes to the products in which they grow.

In the treatment of food products susceptible to mold growth, other than bakery cereal products, these non-toxic esters may be used with advantage. They may be incorporated in the food product during its processing; they may be sprayed or brush-applied on the finished product, or they may be put on or in the material used to wrap the food product, with marked inhibition of mold growth.

In the treatment of textile fibres or the like I have found that such material when dipped in or sprayed with the above identified esters either full strength, or in concentrations of as low as 1% and even less, effectively resist the growth of fungi and mildew. Since the particular compounds referred to above are fat soluble and only slightly soluble in water, they penetrate into the fibres and thus provide prolonged protection.

In the treatment of leather and the like, my esters may be applied by spraying the same thereon or by dipping the material to be treated thereinto either full strength or in relatively low concentrations thereof.

In their application to fungus diseases of the skin, especially "athlete's foot" or epidermophytosis commonly believed caused by the mold *Trichophyton interdigitale*, there are various ways in which my esters may be used. The liquid esters may be applied directly to the infected area by swabbing or by incorporation into an ointment or salve and so applied. Further the esters can be incorporated into an inert powder in a quantity sufficient to be active yet not too great to wet the powder, and the resulting product dusted over the infected areas.

As set forth in the above description of my invention, my compounds may be used either singly or in combination, or in various mixtures thereof in a variety of concentrations and they will still be effective in inhibiting the growth of the types of microorganisms mentioned above.

Having described my invention, what I claim and desire to secure by Letters Patent is:

1. The method of inhibiting the growth of mold which comprises applying to the locus of infection an esterification product of a member selected from the group consisting of propylene glycol and dipropylene glycol with the straight chain, saturated, monocarboxylic acid of the group from 2 to 10 carbon atoms.

2. The method of inhibiting the growth of mold which comprises applying to the locus of infection a concentration of less than one percent of an esterification product of a member selected from the group consisting of propylene glycol and dipropylene glycol with the straight chain, saturated, monocarboxylic acid of the group from 2 to 10 carbon atoms.

3. The method of inhibiting the growth of mold which comprises applying to the locus of infection an esterification product of propylene glycol with the straight chain, saturated, monocarboxylic acid of the group from 2 to 10 carbon atoms.

4. The method of inhibiting the growth of mold which comprises applying to the locus of infection an esterification product of dipropylene glycol with the straight chain, saturated, monocarboxylic acid of the group from 2 to 10 carbon atoms.

5. The method of claim 3, in which the esterification product is propylene glycol propionate pelargonate.

6. The method of claim 3, in which the esterification product is propylene glycol diacetate.

7. The method of claim 4, in which the esterification product is dipropylene glycol diacetate.

SIMON WEIL ARENSON.

REFERENCES CITED

The following references are of record in the file of this patent:

UNITED STATES PATENTS

| Number | Name | Date |
|---|---|---|
| 1,534,752 | Watson | Apr. 21, 1925 |
| 1,627,963 | Fuller | May 10, 1927 |
| 2,154,449 | Hoffman et al. | Apr. 18, 1939 |
| 2,338,184 | Kaufman | Jan. 4, 1944 |

FOREIGN PATENTS

| Number | Country | Date |
|---|---|---|
| 515,306 | Germany | Oct. 29, 1931 |